United States Patent
Wilson et al.

(10) Patent No.: US 8,430,222 B2
(45) Date of Patent: Apr. 30, 2013

(54) FRICTION CLUTCH SYSTEM

(75) Inventors: Patrick R. Wilson, Prescott, AZ (US); Kevin C. Payne, Prescott Valley, AZ (US); William F. Baty, Prescott Valley, AZ (US)

(73) Assignee: TNMJ Caliber, LLC, Prescott, AZ (US)

( * ) Notice: Subject to any disclaimer, the term of this patent is extended or adjusted under 35 U.S.C. 154(b) by 217 days.

(21) Appl. No.: 12/813,273

(22) Filed: Jun. 10, 2010

(65) Prior Publication Data

US 2011/0100776 A1 May 5, 2011

Related U.S. Application Data

(60) Provisional application No. 61/257,341, filed on Nov. 2, 2009.

(51) Int. Cl.
*F16D 13/68* (2006.01)

(52) U.S. Cl.
USPC ......................................... 192/70.17; 29/428

(58) Field of Classification Search ............... 192/70.17, 192/70.19, 70.27, 212, 66.3, 89.22–89.24; 29/428, 469
See application file for complete search history.

(56) References Cited

U.S. PATENT DOCUMENTS

| | | | | |
|---|---|---|---|---|
| 1,962,219 A | * | 6/1934 | Starkey | |
| 3,557,923 A | * | 1/1971 | Nickell | 192/70.17 X |
| 5,127,505 A | * | 7/1992 | Beccaris | 192/70.19 |
| 6,070,708 A | * | 6/2000 | Fukuda et al. | |
| 2006/0249347 A1 | * | 11/2006 | Buer et al. | 192/70.17 |

FOREIGN PATENT DOCUMENTS

| | | | |
|---|---|---|---|
| FR | 2646482 | * | 11/1990 |
| FR | 2674920 | * | 10/1992 |

* cited by examiner

*Primary Examiner* — Gregory Binda
*Assistant Examiner* — Josh Skroupa
(74) *Attorney, Agent, or Firm* — Lowe Graham Jones PLLC

(57) ABSTRACT

A friction clutch system mechanically couples a power source to a driven system of a vehicle while reducing the rotational inertia of the clutch system and yet still providing torsional damping within the system. In one embodiment, the friction clutch system includes a first friction disc assembly directly engaged with a second friction disc assembly. The first disc assembly may include protuberances that extend axially from a hub assembly, which in turn may include damping springs and an internal splined region for coupling to a splined, driven shaft. The second friction disc assembly includes openings, which may take the form of radial slots, configured to engageably receive the protuberances. The first disc assembly may be positioned adjacent to a pressure plate assembly or a flywheel. A floater plate may be located between the first and second friction disc assemblies.

22 Claims, 6 Drawing Sheets

FRICTION CLUTCH SYSTEM

PRIORITY CLAIM

This application claims the benefit of the filing date of U.S. Provisional Patent Application No. 61/257,341 filed on Nov. 2, 2009, which is herein incorporated by reference in its entirety.

FIELD OF THE INVENTION

This invention relates generally to a friction clutch system for mechanically coupling a power source to a driven system of a vehicle.

BACKGROUND OF THE INVENTION

As shown in FIG. 1, one conventional type of friction clutch system 10 may be found in an automobile for engaging, disengaging and transmitting torque from the engine 12 (i.e., power source) to a transmission 14 (i.e., driven system). By way of example, the conventional automotive friction clutch system 10 includes a thrust or pressure plate 16 mounted within a clutch housing 18 so that the thrust plate 16 cannot rotate within the housing 18, but can move axially within the clutch housing. The housing 18 is mounted to a counterthrust plate 20. Being weighted, the counterthrust plate is also commonly used as a flywheel as well. The flywheel 20 is mounted to and driven by the power source 12, which may take the form of an internal combustion engine, an electric motor, etc.

The pressure plate 16 may be biased or pressed toward the flywheel 20 by one or more partially compressed Belleville springs, diaphragms, or coil springs (not shown) also mounted within the housing 18. The assembled combination of the clutch housing 18, the pressure plate 16, and the diaphragm/spring is generally referred to as a pressure plate assembly 22 within the automotive industry.

A friction disc assembly 24 is located between the flywheel 20 and the pressure plate assembly 22. The friction disc assembly 24 includes, in the illustrated example, a floater disc 26 sandwiched between two friction discs 28. The friction discs 28 include friction facings or linings 30, a carrier plate 32 and a splined hub 34. The friction facings 30 bonded or otherwise, are mechanically connected to the carrier plate 32. The carrier plates 32 are coupled by the splined hub 34, which takes the form of an internally splined hub, to an externally splined shaft 36 of the driven member 14.

In FIG. 2, the like components retain the same reference numerals, but the friction clutch system 10 includes a different friction disc assembly 40. As illustrated, the friction disc assembly 40 includes a floater disc 42 sandwiched between two friction discs 44, both having multiple, radially located damper springs 46 for the purpose of smoothing clutch engagement and isolating engine vibrations from the transmission 14 and driveline (not shown). The damper springs 46 are positioned in a sprung hub assembly 48 that extends axially.

For greater torque capacity and improved heat dissipation, a friction clutch system may incorporate multiple friction discs mounted between the pressure plate assembly and the flywheel. For multi-plate clutch designs, the floater or floater plate may be mounted to and driven by the flywheel, with a floater being located between adjacent pair of friction discs. The pressure plate assembly, flywheel and floater also serve as friction surfaces for the friction discs. Because each friction disc assembly typically has two friction surfaces, a two disc clutch will have four friction surfaces, a three disc clutch will have six friction surfaces, and so on.

The torque capacity of a friction clutch system is defined as the maximum amount of torque that can be transferred through the system while in its fully engaged state. Once the clutch torque capacity has been exceeded, torque can be lost through the unintentional slipping effect caused between the friction surfaces of the friction clutch system components.

The conventional clutch system of FIG. 1 includes two solid hubs, each with internal splines for engaging the shaft of the pressure plate assembly, but without any damper springs to reduce the spatial envelop and provide a low rotating weight. However, the lack of damper springs to smooth clutch engagement and isolate engine vibrations can, at least eventually, have a detrimental effect on driveline components. In addition, clutch performance and drive-ability of the vehicle may be diminished.

The conventional, multiple disc clutch system of FIG. 2 with the two sprung hub assemblies, both internally splined for engaging the shaft of the pressure plate assembly, may help with isolating engine vibrations, but require a greater spatial envelope and increase the rotating weight of the system. Current space constraints in various vehicles would not provide room for such an arrangement. Consequently, both conventional systems may be undesirable for use as a high-performance clutch system

SUMMARY OF THE INVENTION

A friction clutch system mechanically couples a power source to a driven system of a vehicle while reducing the rotational inertia of the clutch system and yet still providing torsional damping within the system. In one embodiment, the friction clutch system includes a first friction disc assembly directly engaged with a second friction disc assembly. The first disc assembly may include protuberances that extend axially from a hub assembly, which in turn may include damping springs and an internal splined region for coupling to a splined, driven shaft. The second friction disc assembly includes openings, which may take the form of radial slots, configured to engageably receive the protuberances. The first disc assembly may be positioned adjacent to a pressure plate assembly or a flywheel. A floater plate may be located between the first and second friction disc assemblies.

In one aspect of the invention, a friction clutch system includes a flywheel; a first friction disc assembly having a plurality of protuberances extending axially from a hub assembly; a second friction disc assembly having a plurality of openings configured to engageably receive the protuberances; a floater located between the first and second friction disc assemblies; and a pressure plate assembly operable to generate frictional contact forces between the flywheel and at least one of the friction disc assemblies.

In another aspect of the invention, a method for operating a friction clutch system includes actuating a pressure plate assembly to frictionally engage one of a first or a second friction disc assembly. The first friction disc assembly includes a plurality of protuberances extending axially from a hub assembly, and the second friction disc assembly includes a plurality of openings that engageably receive the protuberances. The method further includes producing frictional contact on a floater plate located between the friction disc assemblies. And lastly, the method includes producing frictional contact between a flywheel and one of the first or second friction disc assemblies. The flywheel is operable to rotate the disc assemblies, floater and pressure plate assembly when the pressure plate assembly is actuated.

In yet another aspect of the invention, a method for assembling a friction clutch system, includes the steps of (1) positioning a floater plate between a first friction disc assembly and a second friction disc assembly; (2) positioning one of the disc assemblies adjacent to a pressure plate assembly; (3) positioning the other disc assembly adjacent to a flywheel; and (4) arranging the first friction disc assembly to directly engage with the second disc assembly, wherein directly engaging includes the first friction disc assembly having a plurality of protuberances extending axially from a hub assembly, and wherein the protuberances extend by an amount sufficient to directly engage a plurality of openings in the second friction disc assembly.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

The present invention generally relates, but is not limited, to friction clutch system for mechanically coupling a power source to a driven system of a vehicle. In at least one embodiment, the present invention combines a spring-damped, splined hub with one or more secondary friction discs. The hub includes axially extending protuberances that engage radial slots located in the secondary friction disc. Advantageously, the friction clutch system described herein may allow for torsional vibration damping while reducing the rotational mass of the system. Further, the friction clutch system may provide a more compact and simplified installation.

Figure 3A:
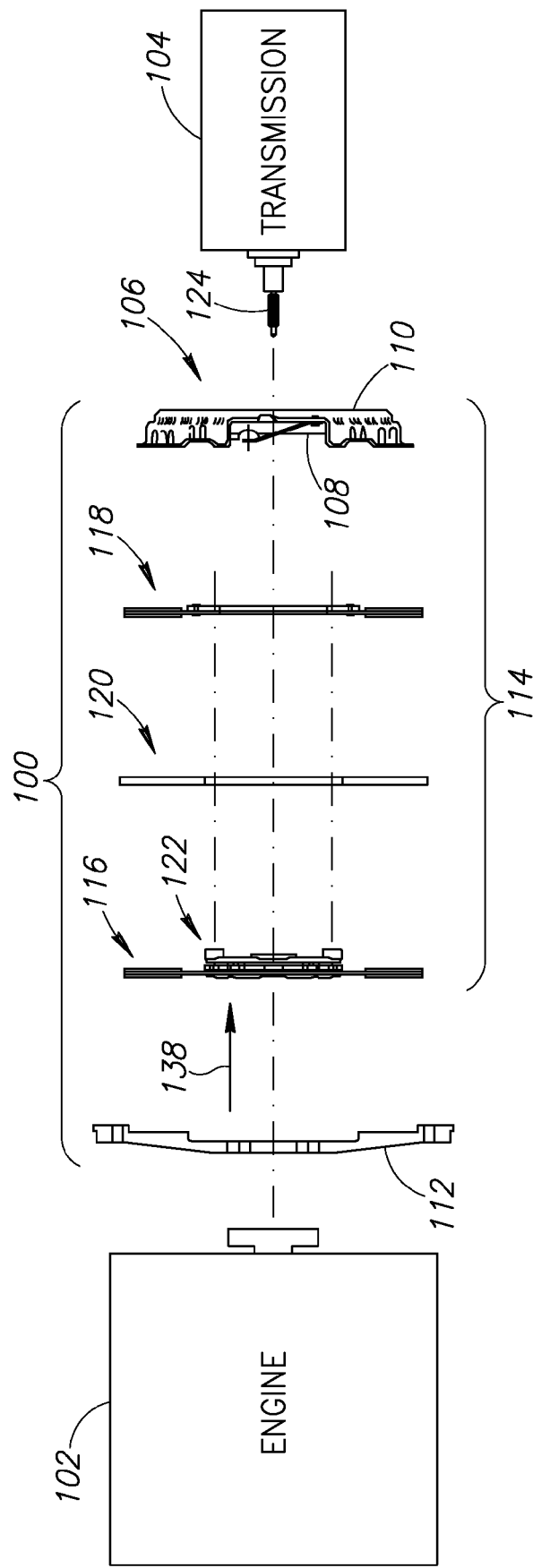
FIG. 3A is an exploded, schematic view of a friction clutch system having a first friction disc assembly with protuberances to directly engage a second friction disc assembly according to an embodiment of the present invention.

FIG. 3A shows an exploded, schematic view of a friction clutch system 100 for engaging, disengaging and transmitting torque from a power source 102 (e.g., engine) to a driven member 104 (e.g., transmission). Similar to the conventional friction clutch systems described above, the illustrated friction clutch system 100 includes a pressure plate assembly 106 comprising a pressure plate 108 mounted within a clutch housing 110, which in turn is mounted to a counterthrust plate or flywheel 112.

In the illustrated embodiment, the pressure plate assembly 106 includes a spring or springs that provide the primary engagement force to a friction disc assembly 114, which may include multiple (two or more) friction discs 116, 118 with a floater plate 120 located therebetween. The floater plate 120 may take the form of the floater plates previously described.

Figure 1:
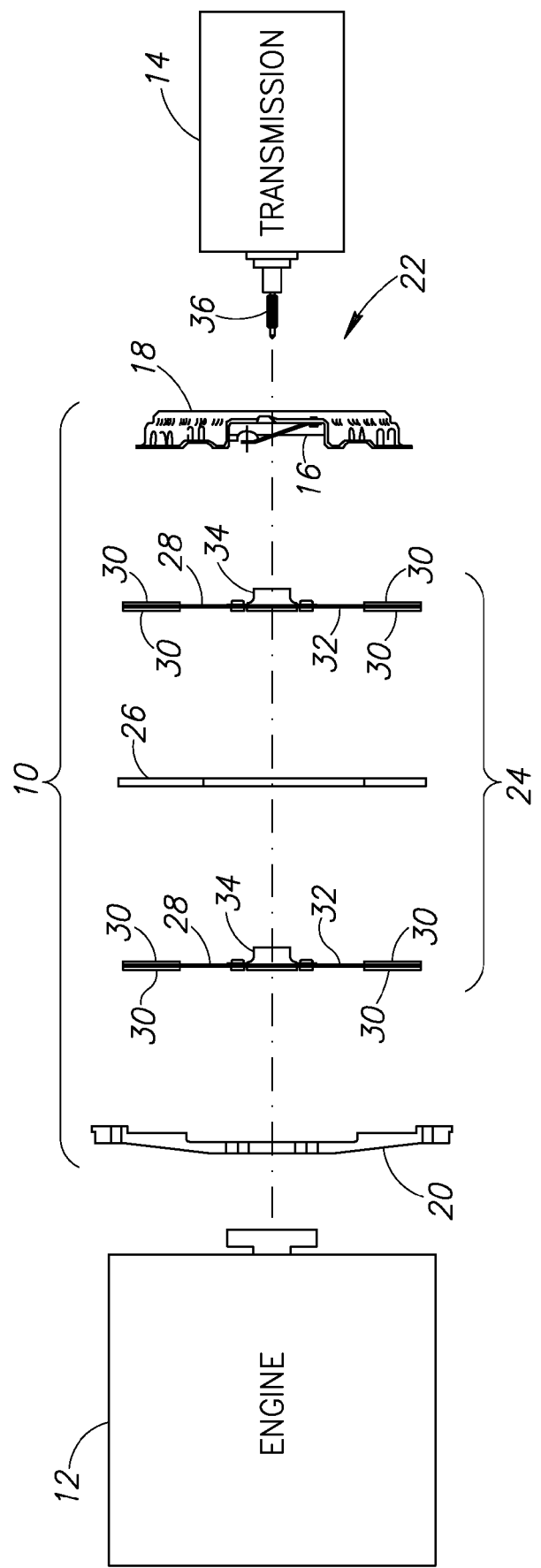
FIG. 1 is an exploded, schematic view of a prior-art friction clutch system having friction disc assemblies each with solid hubs coupled to a splined shaft of a driven member.
Figure 2:
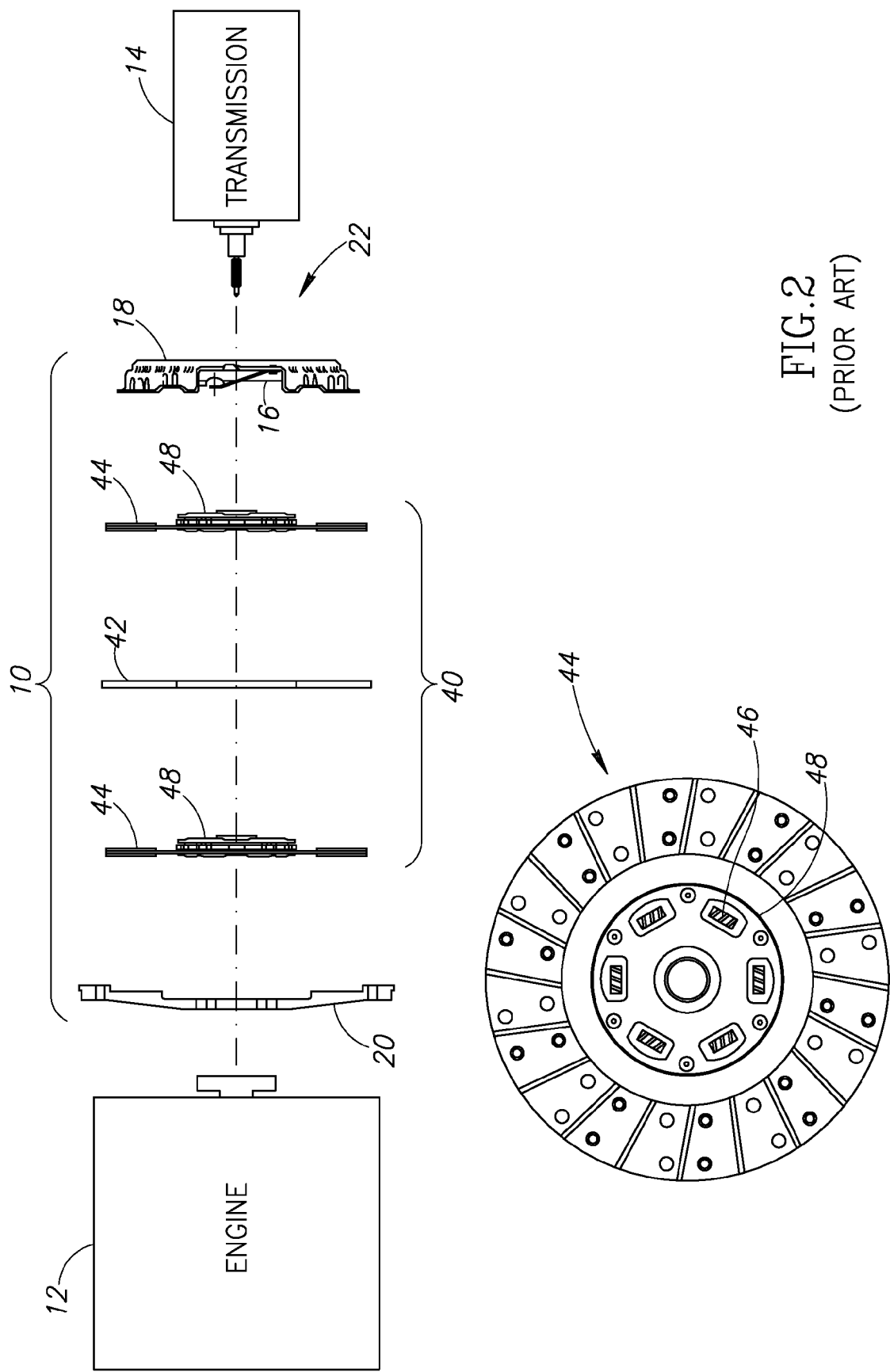
FIG. 2 is an exploded, schematic view of a prior-art friction clutch system having friction disc assemblies each with damping springs located in hubs coupled to a splined shaft of a driven member.

Of the two illustrated friction discs 116, 118, only first disc 116 includes a hub assembly 122 mounted to a driven shaft 124. The second disc 118 does not have a hub assembly (e.g., sprung hub) and is not mounted to the driven shaft 124, but instead engages the first disc 116 as will be described in detail below. Such a configuration may advantageously provide a lighter weight system having a lower rotational inertia while also being more spatially compact than previous systems in which each friction disc included its own hub assembly independently splined to the driven shaft. The space requirements are reduced due to having fewer sprung splined hub assemblies than friction discs. One of the drawbacks of the conventional assembly shown in FIG. 2 was that the amount of space required to have a sprung hub on each friction disc exceeded the allowable design spatial envelope between the pressure plate assembly and flywheel. Thus, to fit such an assembly the springs in the hub assembly would have to be made quite small, making them more difficult to install, harder to retain and less robust in view of the spring forces needed. Another possible advantage of the friction clutch system 100 is that it may replace stock clutch systems within the space envelope provided for the stock clutch system.

Figure 3B:
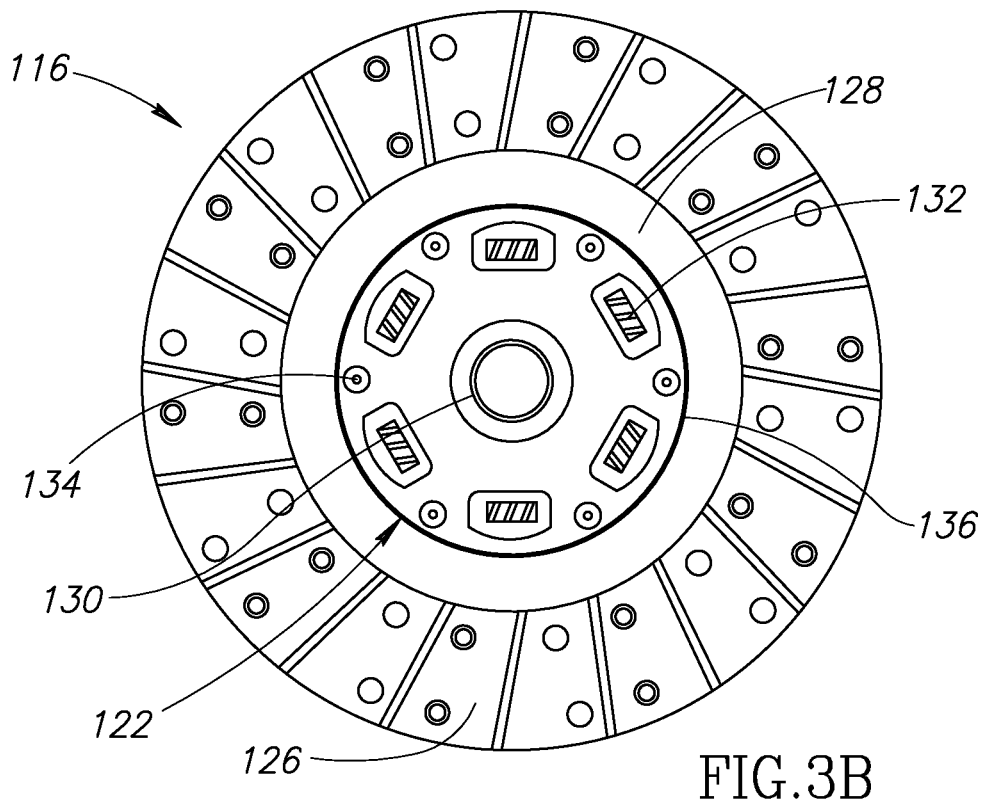
FIG. 3B is schematic, side elevational view of the first friction disc of FIG. 3A with protuberances according to an embodiment of the present invention.
Figure 3C:
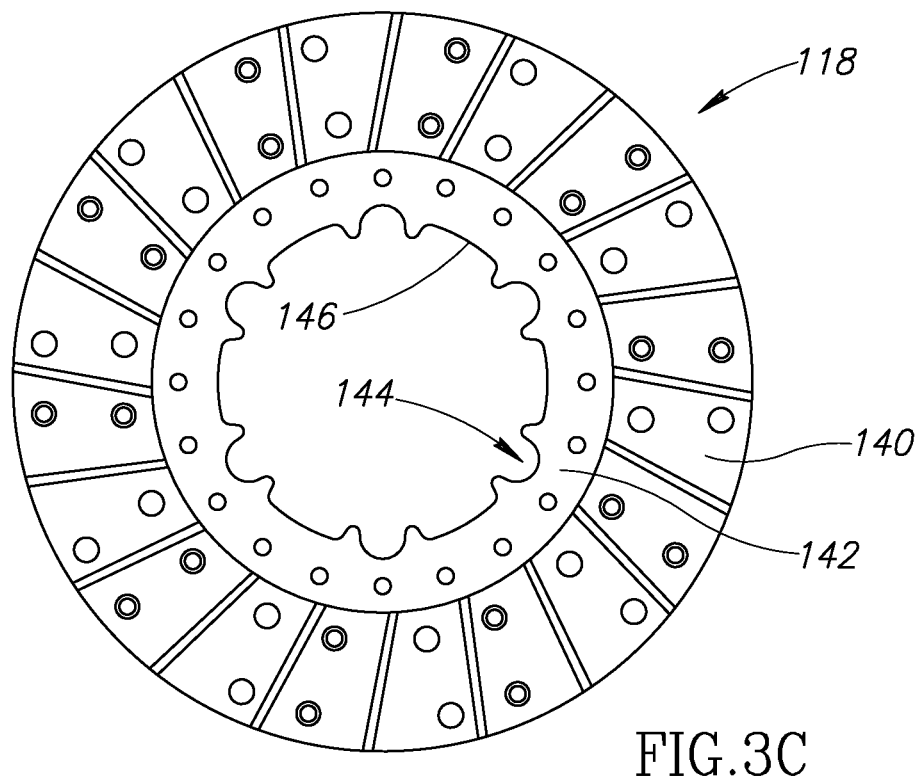
FIG. 3C is schematic, side elevational view of the second friction disc of FIG. 3A with openings according to an embodiment of the present invention.
Figure 4:
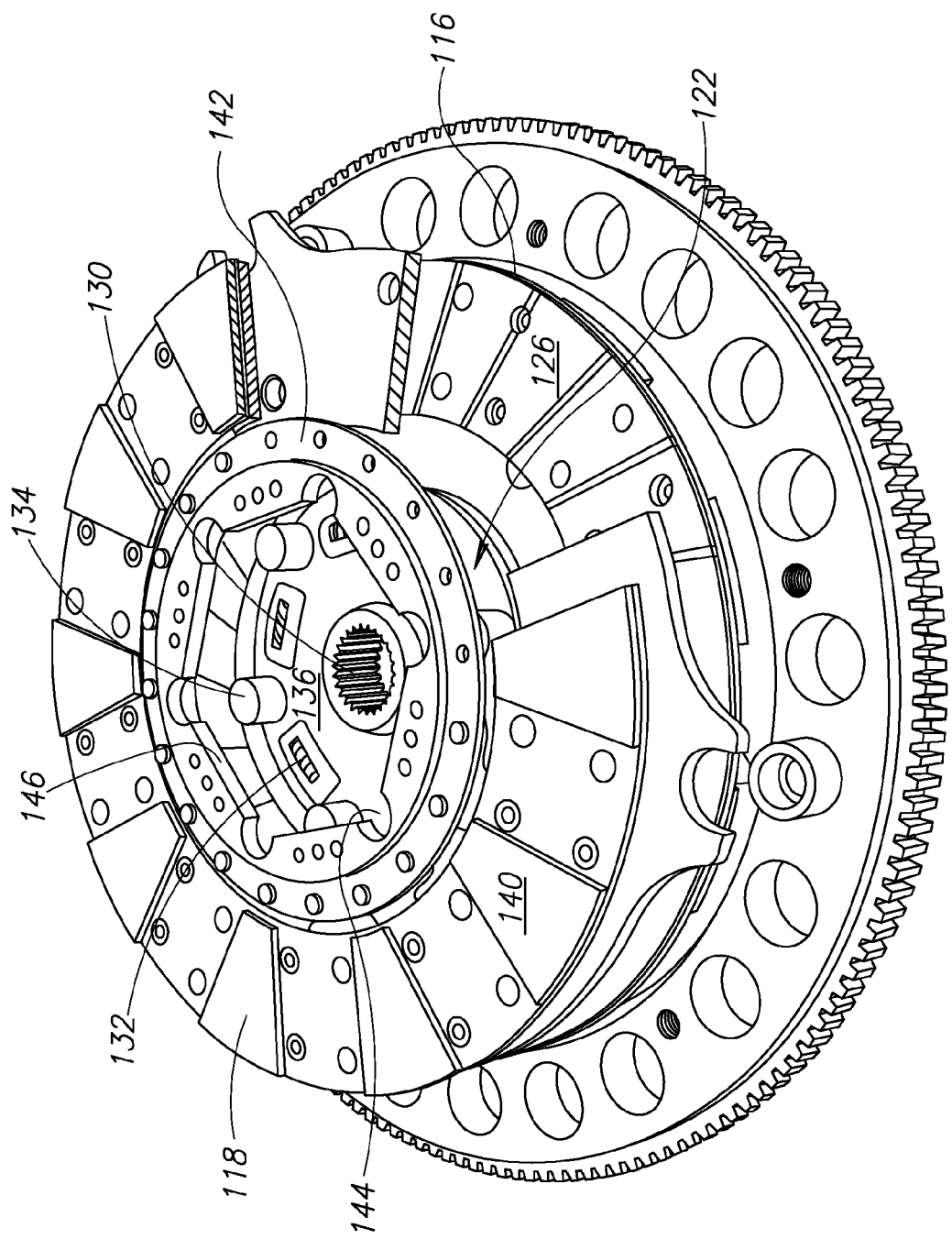
FIG. 4 is a perspective, exploded, partially cut-away view of a friction clutch system having a first friction disc assembly with protuberances to directly engage a second friction disc assembly according to an embodiment of the present invention.

Referring now to FIGS. 3 and 4, the first disc 116 includes the hub assembly 122 and friction facing and/or a plurality of friction pads 126 mounted circumferentially onto a disc body 128. The hub assembly 122 includes an internal splined portion 130, a plurality of damping springs 132, and a plurality of protuberances 134 extending from a hub assembly cover 136. The damping springs 132 may take the form of torsional damping springs. The protuberances 134 may take the form of pins or dowels, which may be cylindrical or have another type of cross-sectional shape. The protuberances 134 extend in an axial direction as indicated by arrow 138 (FIG. 3).

The second disc 118 includes a friction facing and/or a plurality of friction pads 140 coupled to a central member 142. A plurality of openings 144 are machined or otherwise formed into the central member 142. The openings 144 may take the form of radial slots or notches extending from an inner edge 146 of the central member 142. In addition, the openings 144 are configured to receivably and directly engage the protuberances 134 of the first disc 116. This engagement prevents the discs 116, 118 from rotating relative to one another, but will permit independent axial movement of the secondary friction disc(s) within the given design range. As best seen in FIG. 4, the openings 144 preferably have a shape that complementarily corresponds to the cross-sectional shape of the protuberances 134. For example, if the protuberances 134 are cylindrical then the openings will be circular as well. Alternatively radial slots could receive protuberances of various configurations. Further the openings 144 are sized and aligned to accurately receive the protuberances 134.

Figure 5:
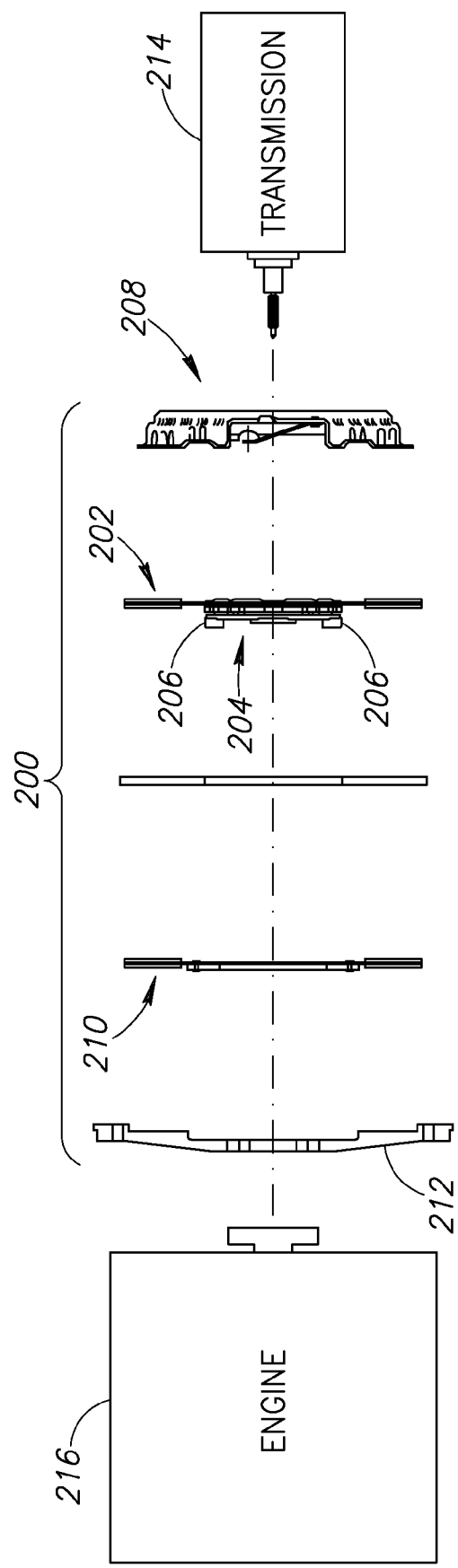
FIG. 5 is a an exploded, schematic view of a friction clutch system having a first friction disc assembly positioned adjacent to a driven member (e.g., pressure plate assembly) and a second friction disc assembly positioned adjacent to a power source (e.g., flywheel) according to another embodiment of the present invention.

FIG. 5 shows a friction clutch system 200 in which a first disc 202 with a hub assembly 204 and protuberances 206 is positioned adjacent to a pressure plate assembly 208. A second disc 210 with openings (not shown) to receive the protuberances 206 is positioned adjacent to a flywheel 212. In comparing FIG. 5 to FIG. 3, the locations of the first and second discs have been switched. Consequently, the first disc 202 may be on the driven side proximate the driven member 214 (e.g., transmission) while the second disc 210 may be on the driving or power side proximate the power source 216 (e.g., engine).

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. A friction clutch system having a flywheel and a pressure plate assembly, the system comprising:
    a first friction disc assembly including a friction disc and a hub assembly formed as a single member, and a plurality of protuberances extending axially from the hub assembly, wherein the protuberances extend axially beyond the hub assembly;
    a second friction disc assembly having a plurality of openings configured to engageably receive the protuberances; and
    a floater located between the first and second friction disc assemblies, wherein the pressure plate assembly is operable to generate frictional contact forces between the flywheel and at least one of the friction disc assemblies.

2. The friction clutch system of claim 1, wherein the first friction disc assembly is positioned adjacent to the flywheel.

3. The friction clutch system of claim 1, wherein the first friction disc assembly is positioned adjacent to the pressure plate assembly.

4. The friction clutch system of claim 1, wherein the hub assembly includes damping springs.

5. The friction clutch system of claim 1, wherein the protuberances are cylindrical posts that permit the first and second discs to move axially toward and away from one another.

6. The friction clutch system of claim 5, wherein the plurality of openings are cylindrical slots.

7. The friction clutch system of claim 1, wherein the plurality of openings are machined slots extending from an inner radial edge of the second friction disc assembly.

8. The friction clutch system of claim 1, wherein the plurality of openings are uniformly spaced apart.

9. The friction clutch system of claim 1, wherein the hub assembly includes an internal spline for coupling to an externally splined shaft.

10. The friction clutch system of claim 1, wherein the coupler includes a post extending axially from the hub assembly, the post operating as a key to rotationally engage the second friction disc assembly through the floater plate.

11. The friction clutch system of claim 1, wherein the first friction disc assembly is positioned adjacent to one of either the flywheel or the pressure plate assembly.

12. The friction clutch system of claim 1, wherein the second friction disc assembly contacts the hub cover.

13. The friction clutch system of claim 4, wherein the damping springs and protuberances are positioned radially on the hub assembly with the damping springs and protuberances at least partially overlapping radially.

14. The friction clutch system of claim 4 wherein there are the same number of damping springs as protuberances and the damping springs and protuberances are interspersed among the damping springs in an alternating pattern.

15. A method for operating a friction clutch system, the method comprising:
    actuating a pressure plate assembly to frictionally engage one of a first or a second friction disc assembly, the first friction disc assembly having a hub assembly, a hub cover, and a plurality of protuberances extending axially from the hub cover, the second friction disc assembly having a plurality of openings that engageably receive the protuberances;
    producing frictional contact on a floater plate located between the friction disc assemblies; and
    producing frictional contact between a flywheel and one of the first or second friction disc assemblies, the flywheel operable to rotate the disc assemblies, floater and pressure plate assembly when the pressure plate assembly is actuated.

16. The method of claim 15, wherein actuating the pressure plate assembly includes maintaining a splined connection between a driven shaft and only one of the first or second disc assemblies.

17. The method of claim 15, further comprising disengaging the frictional contact between the floater plate, friction disc assemblies and flywheel.

18. A method for assembling a friction clutch system, the method comprising:
    positioning a floater plate between a first friction disc assembly and a second friction disc assembly;
    positioning one of the disc assemblies adjacent to a pressure plate assembly;
    positioning the other disc assembly adjacent to a flywheel; and
    arranging the first friction disc assembly to directly engage with the second disc assembly, wherein directly engaging includes the first friction disc assembly having a hub assembly, a hub cover, and a plurality of protuberances extending axially from the hub cover, and wherein the protuberances extend by an amount sufficient to directly engage a plurality of openings in the second friction disc assembly.

19. The method of claim 18, wherein arranging the first friction disc assembly to directly engage with the second disc assembly includes circumferentially aligning the protuberances with the openings.

20. The method of claim 18, further comprising arranging the first friction disc assembly on a splined shaft.

21. The method of claim 18, further comprising arranging a plurality of damping springs in hub assembly of the first friction disc assembly.

22. A friction clutch system having a flywheel and a pressure plate assembly, the system comprising:
    a first friction disc assembly having a hub assembly with a hub cover and a spring damping member coupled to the hub assembly, the first friction disc being situated between the flywheel and the pressure plate assembly;
    a second friction disc situated between the flywheel and the pressure plate assembly; and
    a floater plate located between the first and second friction disc assemblies, wherein the pressure plate assembly is operable to generate frictional contact forces between the flywheel and at least one of the friction disc assemblies; and a coupler extending between the first and second friction discs for generally driving the discs together, subject to the spring damping member, wherein the coupler extends from the hub cover.

* * * * *